Sept. 2, 1930.   H. I. BEADLE   1,774,866
PRESERVATIVE MATERIAL AND METHOD OF MAKING AND APPLYING THE SAME
Filed Jan. 28, 1928
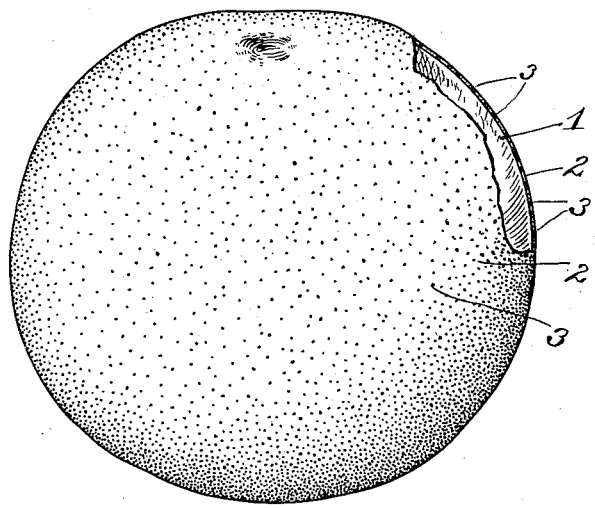
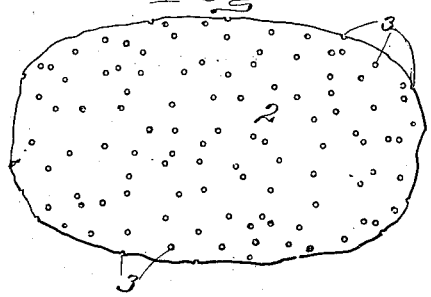
INVENTOR
H. I. Beadle
BY Rogers, Kennedy Campbell
ATTORNEYS.

Patented Sept. 2, 1930

1,774,866

UNITED STATES PATENT OFFICE

HAROLD I. BEADLE, OF LARCHMONT, NEW YORK, ASSIGNOR TO THE CELLACOTE COMPANY, INCORPORATED, A CORPORATION OF NEW YORK

PRESERVATIVE MATERIAL AND METHOD OF MAKING AND APPLYING THE SAME

Application filed January 28, 1928. Serial No. 250,114.

This invention relates to the protection and preservation of perishable articles, such as fruits, vegetables, eggs, etc., etc., and has reference more particularly to the employment of a film or coating of cellulose which is applied to the article in the form of a homogeneous enclosing covering to protect it, as set forth in an application filed in the name of George W. Beadle on the 12th day of August, 1925, Ser. No. 49,680, Patent No. 1,685,392, the protective covering in said patent being transparent and non-adherent, but contracted on and gripping the article with initial tension.

It has been found in the practice of the invention of said application that in the covering of certain fruits and vegetables, it is desirable to permit of the passage of gases through the enclosing covering, in other words, the enclosed fruit should be permitted to "breathe," for if such gases are retained by the enclosing covering or not allowed to escape, conditions will be set up in certain fruits and under certain conditions, which will unfavorably affect or destroy the natural flavor of the fruit.

It is the aim of the present invention to obviate this objection, and to this end the invention comprehends the provision of holes or passages in the homogeneous coating covering to make the same pervious, which while being sufficient in size and number to admit of the passage of gases therethrough, will not affect or destroy the homogeneous integrity of the coating or covering as a whole, nor the gripping compressive tension exerted by the covering on the fruit.

The invention therefore consists of the improved method involved in the formation and application of the covering; and consists also of the improved preservative covering per se, and also the improved covered article.

In the accompanying drawings:

Fig. 1 is a perspective view of a grape fruit having a preservative covering thereon embodying the invention.

Fig. 2 is a fragmentary view of a piece of the covering removed.

Referring to the drawings:

The improved enclosing covering 2 is shown as a homogeneous structure tightly contracted on and gripping with initial tension a grape fruit 1, the said covering being transparent and non-adherent to the fruit. A multitude of minute holes or passages 3 is shown in the covering through which the gases, such as carbon dioxide generated by the chemical reaction taking place in the fruit, may escape, and through which gases, such as air, may enter, such flow of gases and air constituting the so-called "breathing" action characteristic of certain fruits, vegetables, and the like.

In the preparation of the covering material, in accordance with my invention, and in the application of the same to the fruit, I proceed as follows:

Cellulose is treated with caustic soda solution to form alkali cellulose, and after aging is treated with carbon bisulfide to effect xanthation. The cellulose xanthate is then dissolved in a suitable caustic soda solution so as to produce a solution of the desired viscosity.

The viscous solution is now violently agitated in any suitable manner to bring about its aeration and cause it to entrap air bubbles throughout the mass. This may be effected in different ways. For instance, the solution may be violently agitated by mechanical means, or air under pressure may be injected or introduced therein, the viscous nature of the solution causing the air to be entrapped and retained throughout the solution in the form of a multitude of small bubbles.

The solution is now ready to be applied as a coating to the fruit, and it may be applied thereto in different ways, as for instance by immersing the fruit in a bath of the solution, or flowing the solution on the fruit, or spraying the same thereon, the purpose being to apply the solution in a uniformly distributed coating throughout the entire surface of the fruit so as to completely cover the same. The coating thus applied is now subjected to treatments to coagulate and purify the coating material and render it transparent, which may be effected in any suitable manner, as for instance, by first subjecting the coating to the action of a neutral salt solution, specifically ammonium sulfate, the effect of which will be to partially coagulate and partially purify the material, and the coating is then treated in an acid solution, such as sulfuric acid, to neutralize the caustic soda, and to remove the sulfides, which will complete the coagulation and effect thorough purification of the material, thereby regenerating the cellulose and producing a cellulose covering which is subsequently washed and dried, with the result that the covering will become transparent and will contract with great force and will grip the article under tension.

In applying the aerated coating solution to the article as described, certain of the air bubbles will break and thereby form holes through the covering, and on the drying of the covering other air bubbles which may be at the surface of the covering will break and form additional holes, and as the covering shrinks in the final drying action the holes will become enlarged.

The number and size of the holes in the covering may be controlled by the manner of aerating the viscose solution, such as by varying the violence and period of agitation and the viscosity of the solution.

It has been found that the cellulose solution employed as a covering material and applied to fruits or vegetables either by immersion or flowing the solution thereon, or spraying the same or otherwise applying it, is very effective in destroying fungus bacteria on the entire skin or surface of the fruit or vegetable. This fungicidal action is due to the combination in the coating material of cellulose xanthate, caustic soda and sulfides. After the time required for the effective action of these materials, the cellulose is regenerated and the caustic soda and sulfides are removed by the employment in the purification of the coating material of sulfuric acid, which is also effective in destroying such bacteria which may not have been acted upon by the fungicides present in the original coating solution.

Having thus described my invention, what I claim is:

1. The method of preserving perishable articles which consists in applying a covering to the same of aerated hydrated cellulose in liquid form, treating the covering while on the article to coagulate the same, and drying the covering to cause it to shrink.

2. The method of preserving perishable articles which consists in covering the same with hydrated cellulose in liquid form having distributed throughout the mass entrapped air in the form of bubbles, treating the covering while on the article to coagulate the same, and finally drying the covering.

3. The method of preserving perishable articles which consists in subjecting a solution of cellulose hydrate to an aerating treatment, covering the article with the aerated solution, and drying the covering to cause it to shrink.

4. The method of preserving perishable articles which consists in providing a xanthated cellulose solution, subjecting the solution to treatment to cause the same to entrap air in the form of bubbles, applying the treated cellulose to the article to completely enclose the same, subjecting the covering while on the article to treatment with a neutral salt solution and then with an acid to coagulate and purify the same, washing the treated covering, and finally drying the same to cause it to shrink.

5. In the method of preserving perishable articles, subjecting a hydrated cellulose solution to an aerating treatment to produce bubbles therein to form a covering material containing holes.

In testimony whereof, I have affixed my signature hereto.

HAROLD I. BEADLE.